US012693185B2

(12) United States Patent
Cho et al.

(10) Patent No.: US 12,693,185 B2
(45) Date of Patent: Jul. 28, 2026

(54) GAS LEAK DETECTION DEVICE AND DETECTING METHOD

(71) Applicant: VIA Technologies, Inc., New Taipei City (TW)

(72) Inventors: Yeh Cho, New Taipei City (TW); Ting-Yuan Chang, New Taipei City (TW); Fan-Hao-Chi Fang, New Taipei City (TW)

(73) Assignee: VIA Technologies, Inc., New Taipei City (TW)

( * ) Notice: Subject to any disclaimer, the term of this patent is extended or adjusted under 35 U.S.C. 154(b) by 307 days.

(21) Appl. No.: 18/596,687

(22) Filed: Mar. 6, 2024

(65) Prior Publication Data

US 2025/0012655 A1     Jan. 9, 2025

Related U.S. Application Data

(60) Provisional application No. 63/524,865, filed on Jul. 4, 2023.

(30) Foreign Application Priority Data

Dec. 15, 2023     (TW) ................................. 112148910

(51) Int. Cl.
*G01M 3/00*          (2006.01)
*G01M 3/38*          (2006.01)
(Continued)

(52) U.S. Cl.
CPC .............. *G01M 3/002* (2013.01); *G01M 3/38* (2013.01); *G01N 21/8851* (2013.01); *G08B 21/12* (2013.01); *G01N 2021/8887* (2013.01)

(58) Field of Classification Search
CPC .... G01M 3/002; G01M 3/38; G01N 21/8851; G08B 21/12
(Continued)

(56) References Cited

U.S. PATENT DOCUMENTS

| | | | | |
|---|---|---|---|---|
| 2019/0331301 A1* | 10/2019 | Du | ......................... | G01N 33/42 |
| 2021/0102931 A1* | 4/2021 | Kukreja | ............... | G01N 33/225 |

(Continued)

FOREIGN PATENT DOCUMENTS

| | | |
|---|---|---|
| CN | 105208299 | 12/2015 |
| CN | 115751203 | 3/2023 |

OTHER PUBLICATIONS

"Office Action of Taiwan Counterpart Application", issued on Aug. 27, 2024, p. 1-p. 6.

*Primary Examiner* — William D Titcomb
(74) *Attorney, Agent, or Firm* — JCIPRNET

(57)     ABSTRACT

A gas leak detection device and a detecting method are provided. The gas leak detection device includes a remote temperature sensor and a processor. The remote temperature sensors detect an area-to-be-monitored to obtain a plurality of thermal images. Each pixel position in the thermal images includes a corresponding temperature value. The processor obtains the thermal images from the remote temperature sensor, calculates a detected temperature value of each environmental block according to each of a plurality of environmental blocks in the thermal images, calculates a temperature judgment threshold based on the detected temperature value of each environmental block in a detection time period, determines whether a temperature of at least one region-of-interest is abnormal based on the temperature judgment threshold, and performs a warning operation when the temperature of the at least one region-of-interest is abnormal.

8 Claims, 4 Drawing Sheets

(51) Int. Cl.
     *G01N 21/88*       (2006.01)
     *G08B 21/12*       (2006.01)

(58) Field of Classification Search
     USPC ......................................................... 382/100
     See application file for complete search history.

(56)                 References Cited

U.S. PATENT DOCUMENTS

2022/0316950 A1*   10/2022   Kim ........................ G01J 5/041
2022/0326108 A1*   10/2022   Leboucher ............ G01M 3/007

\* cited by examiner

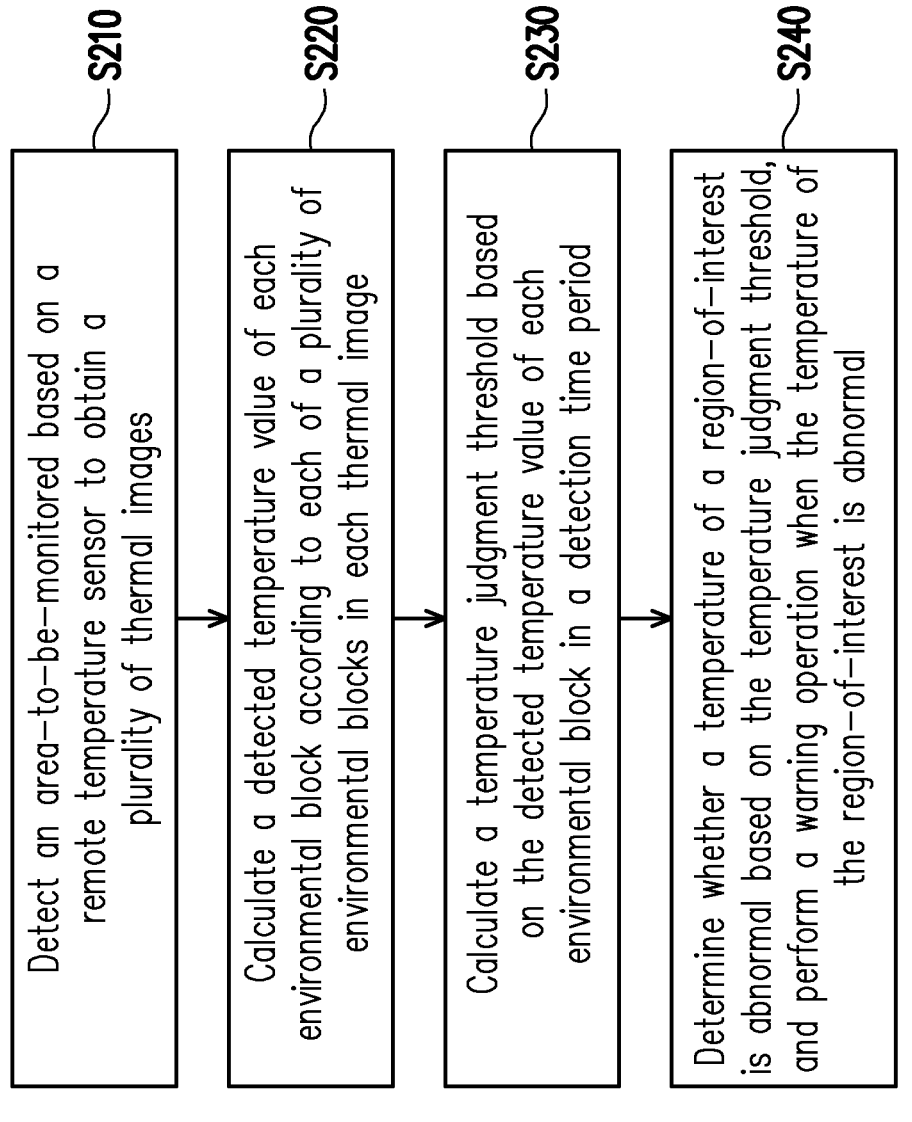

S210

Detect an area-to-be-monitored based on a remote temperature sensor to obtain a plurality of thermal images

S220

Calculate a detected temperature value of each environmental block according to each of a plurality of environmental blocks in each thermal image

S230

Calculate a temperature judgment threshold based on the detected temperature value of each environmental block in a detection time period

S240

Determine whether a temperature of a region-of-interest is abnormal based on the temperature judgment threshold, and perform a warning operation when the temperature of the region-of-interest is abnormal

FIG. 2

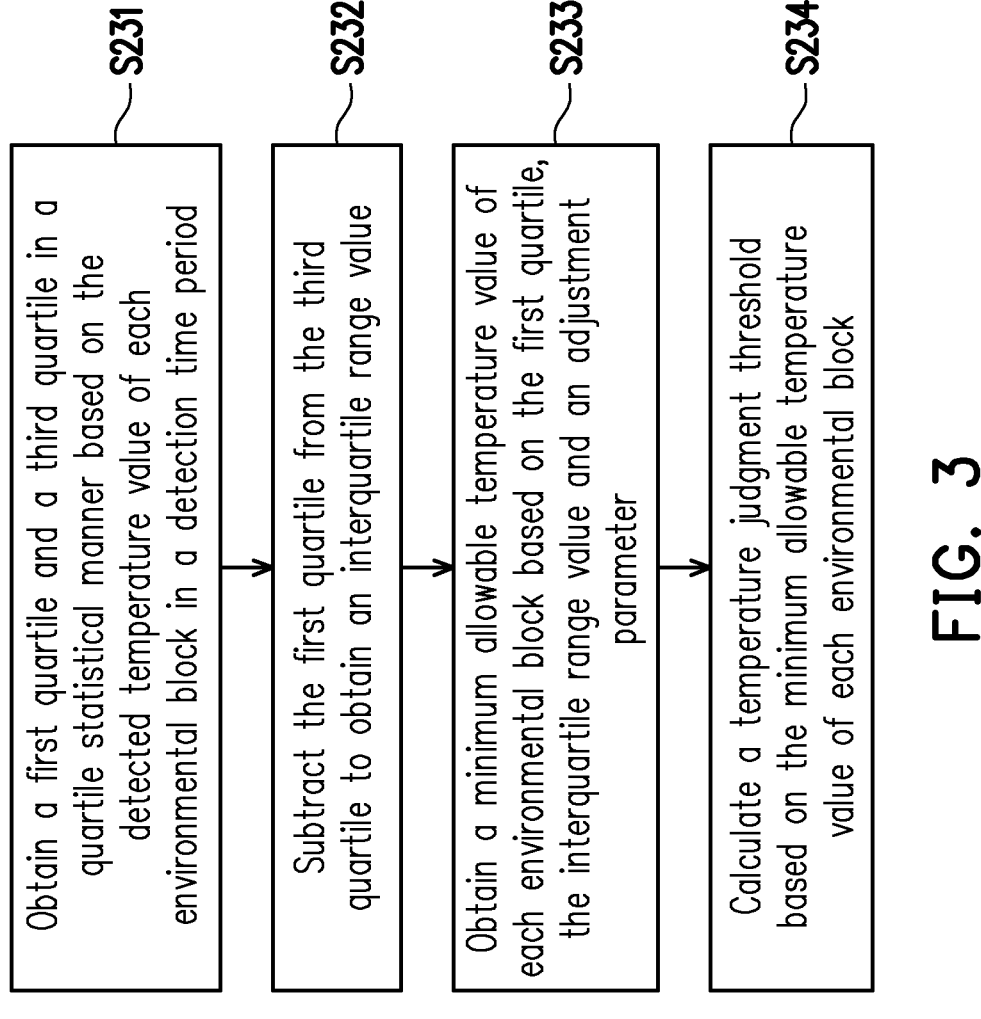

S231

Obtain a first quartile and a third quartile in a quartile statistical manner based on the detected temperature value of each environmental block in a detection time period

S232

Subtract the first quartile from the third quartile to obtain an interquartile range value

S233

Obtain a minimum allowable temperature value of each environmental block based on the first quartile, the interquartile range value and an adjustment parameter

S234

Calculate a temperature judgment threshold based on the minimum allowable temperature value of each environmental block

FIG. 3

GAS LEAK DETECTION DEVICE AND DETECTING METHOD

CROSS-REFERENCE TO RELATED APPLICATION

This application claims the priority benefit of U.S. provisional application Ser. No. 63/524,865, filed on Jul. 4, 2023, and Taiwan application serial no. 112148910, filed on Dec. 15, 2023. The entirety of each of the above-mentioned patent applications is hereby incorporated by reference herein and made a part of this specification.

TECHNICAL FIELD

The disclosure relates to a gas leak detection technique, and particularly relates to a gas leak detection device and a detecting method.

BACKGROUND

Gas transportation is an important part of industrial safety technology. Factories usually transport liquefied gas through pipelines in a form of liquid gas, such as using the pipelines to transport pressurized liquid ammonia, liquid hydrogen, etc. However, the liquefied gas may probably have unexpected leaks, leading to hazards. For example, if ammonia gas used as a refrigerant leaks, the liquefied ammonia gas will be instantly vaporized into ammonia gas, and if the ammonia gas contacts human body, it may cause corrosion and even lead to explosion.

Leak detection of existing gas transportation pipelines is usually achieved through a combination of manpower and a handheld detection device (such as a hyperspectral imaging camera) in a fixed patrol manner. However, the handheld device is relatively expensive and the above manner requires a significant amount of manpower. Although a large number of detection devices may be installed around the pipelines, it may also increase construction cost. In addition, if a hyperspectral imaging camera is used to determine the presence of a plurality of gases, settings of the hyperspectral imaging camera needs to be updated in real time, which means that it is required to input information about the plurality of gases in the camera in real time to serve for judgment. In addition, the hyperspectral imaging camera also has difficulty in detection of presence of the aforementioned gases in distant fields. In overall, the hyperspectral imaging camera may only implement detection through manpower combined with the handheld method, and it is difficult to monitor an entire factory environment through only a few hyperspectral imaging cameras.

SUMMARY

The disclosure is directed to a gas leak detection device and a detecting method thereof, which monitor whether gas leakage occurs by detecting environmental temperature changes (for example, temperature drop) caused by accidental release of liquefied gas, thereby monitoring an environment to be monitored at a lower cost.

An embodiment of the disclosure provides a gas leak detection device including a remote temperature sensor and a processor. The remote temperature sensor detects an area-to-be-monitored to obtain a plurality of thermal images. Each pixel position in the thermal images includes a corresponding temperature value. The processor is coupled to the remote temperature sensor. The processor obtains the thermal images from the remote temperature sensor, calculates a detected temperature value of each environmental block according to each of a plurality of environmental blocks in each thermal image, calculates a temperature judgment threshold based on the detected temperature value of each environmental block in a detection time period, determines whether a temperature of at least one region-of-interest is abnormal based on the temperature judgment threshold, and performs a warning operation when the temperature of the at least one region-of-interest is abnormal.

An embodiment of the disclosure provides a gas leak detecting method including following steps: using a remote temperature sensor to detect an area-to-be-monitored to obtain a plurality of thermal images, wherein each pixel position in the thermal images includes a corresponding temperature value; calculating a detected temperature value of each environmental block according to each of a plurality of environmental blocks in each thermal image; calculating a temperature judgment threshold based on the detected temperature value of each environmental block in a detection time period; and determining whether a temperature of at least one region-of-interest is abnormal based on the temperature judgment threshold, and performing a warning operation when the temperature of the at least one region-of-interest is abnormal.

Based on the above description, the gas leak detection device and the detecting method thereof described in the embodiments of the disclosure use an infrared temperature sensor to sense and capture thermal images/temperature information of the area-to-be-monitored, and then use the thermal images/temperature information and historic thermal images/temperature information to dynamically calculate the temperature threshold, and determine whether the region-of interest in the area-to-be-monitored has excessively low temperature based on the temperature threshold. In this way, various embodiments of the disclosure may determine whether the gas leaks by detecting the environmental temperature variation (for example, temperature drop) caused by accidental release of the liquefied gas, thereby monitoring the environment to be monitored at a lower cost.

BRIEF DESCRIPTION OF THE DRAWINGS

FIG. 2 is a schematic diagram of a gas leak detecting method according to an embodiment of the disclosure.

FIG. 3 is a detailed flowchart of step S230 in FIG. 2.

DETAILED DESCRIPTION OF DISCLOSED EMBODIMENTS

Figure 1:
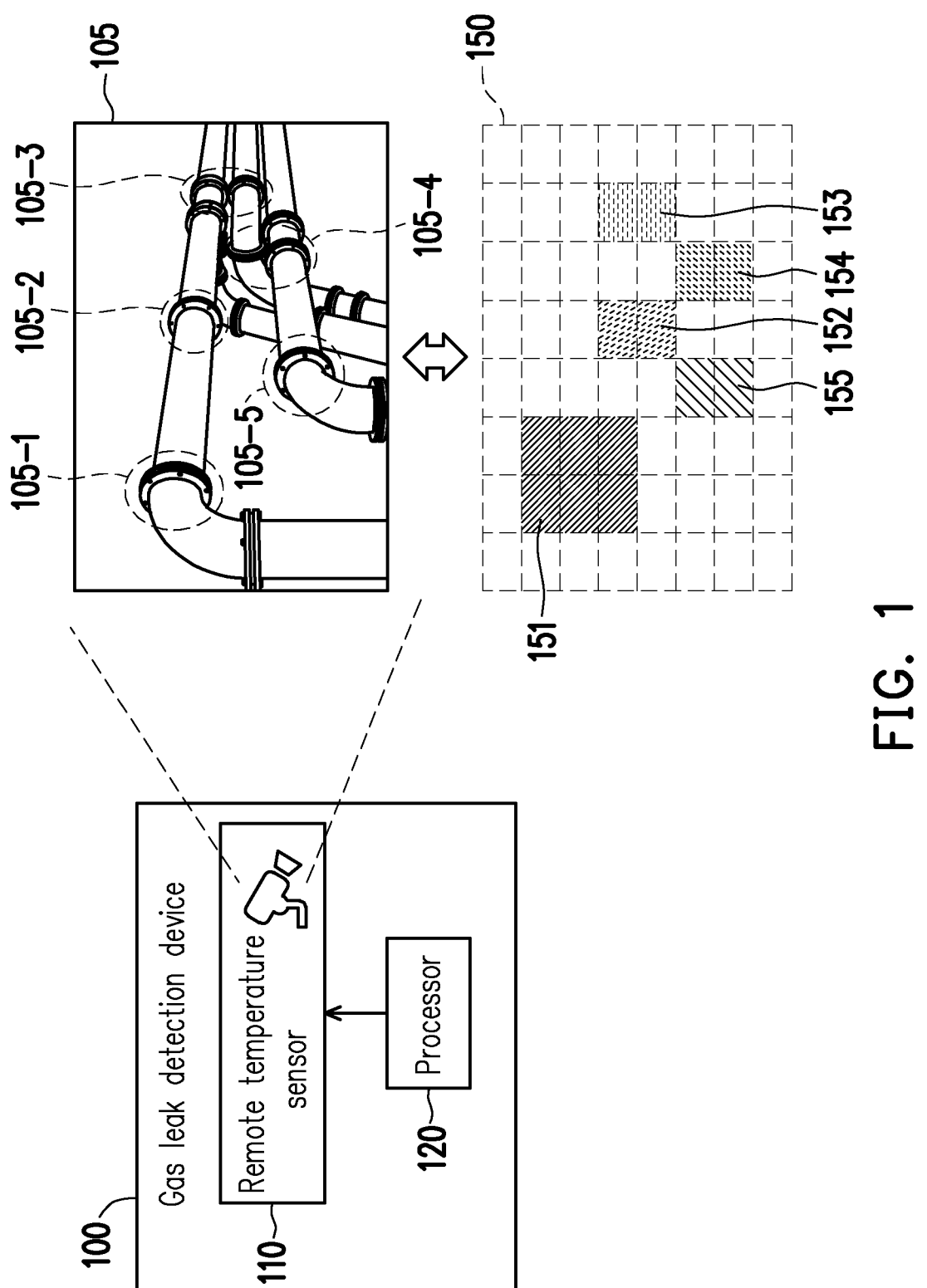
FIG. 1 is a schematic diagram of a gas leak detection device, an area-to-be-monitored and a thermal image according to an embodiment of the disclosure.

FIG. 1 is a schematic diagram of a gas leak detection device 100, an area-to-be-monitored 105 and a thermal image 150 according to an embodiment of the disclosure. The gas leak detection device 100 mainly includes a remote temperature sensor 110 and a processor 120. The processor 120 is coupled to the remote temperature sensor 110. The area-to-be-monitored 105 may be a factory space where liquefied gas is stored or transported. The embodiment is set up to avoid leakage of liquefied gas stored/transported in the factory space.

The embodiment mainly stores a liquefied gas rather than storing gas only, and pipes in the area-to-be-monitored 105 are used to transport the liquefied gas. For example, the liquefied gas in the embodiment may be liquefied ammonia (which is often used as a refrigerant), liquefied hydrogen, etc. Since when the pressurized liquefied gas encounters heat, it will vaporize from a liquid state to a gaseous state, when the liquefied gas leaks from the pipeline, it may gain heat energy from nearby, so that the liquefied gas is converted into gas, which causes temperature drop of the environment near a leakage position. The embodiment monitors the environmental temperature variation at a possible leak position to issue a warning timely.

Therefore, the embodiment of the disclosure uses the remote temperature sensor 110 to obtain an environmental temperature of the area-to-be-monitored 105, and dynamically calculates a temperature judgment threshold in the area-to-be-monitored 105 based on the environmental temperature information, so as to determine whether a temperature of a region-of-interest (ROI) in the area-to-be-monitored 105 is abnormal by using the temperature judgment threshold, thereby determining whether to perform a warning operation.

The warning operation here may have various forms. For example, the liquefied gases stored or transmitted in the factory space are usually known gases. When the warning operation is performed, in addition to immediately notifying a relevant personnel such as a person in charge or a fire department, etc., the personnel may also be informed with a type of the gas suspected to be leaking for a purpose of disaster prevention. In addition, in the embodiment, protective equipment may also be installed around the area-to-be-monitored 105, and when a warning operation is performed, the protective equipment may be activated for immediate response. Such protective equipment may be emergency exhaust equipment, sprinkler equipment, air-tight doors, etc., and may implement corresponding protection based on known leaked gases. Those who apply this embodiment are not limited to the form of the warning operation.

The remote temperature sensor 110 of the embodiment may be a far-infrared thermal imager. It is cheaper than a hyperspectral imaging camera. The remote temperature sensor 110 may detect the area-to-be-monitored 105 through an infrared thermal imaging temperature measurement technology to generate a corresponding thermal image 150. Each pixel position in the thermal image includes a corresponding temperature value. The embodiment divides the thermal image 150 into a plurality of environmental blocks. For example, the thermal image 150 in FIG. 1 has 64 (8×8) environmental blocks.

In the area-to-be-monitored 105 and the thermal image 150 in FIG. 1, a part of the environmental blocks may be set as the ROI in the area-to-be-monitored 105. There are a plurality of pipelines in the area-to-be-monitored 105, and joints of the pipelines (which may be collectively referred to as flanges) or turns of the pipelines (regions 105-1 to 105-5 marked in the area-to-be-monitored 105 in FIG. 1) are places where gas leakage is most likely to occur, so the environmental blocks corresponding to the regions 105-1 to 105-5 in the area-to-be-monitored 105 are respectively set as the ROIs 151-155. In the embodiment, the region 105-1 corresponds to the ROI 151, the region 105-2 corresponds to the ROI 152, and so on. In other words, the ROIs 151 to 155 belong to at least one or more of the environmental blocks in the thermal image 150.

FIG. 2 is a schematic diagram of a gas leak detecting method according to an embodiment of the disclosure. The detecting method in FIG. 2 is applicable to the gas leak detection device 100 in FIG. 1. Referring to FIG. 1 and FIG. 2 at the same time, in step S210, the processor 120 detects the area-to-be-monitored 105 based on the remote temperature sensor 110 to obtain a plurality of thermal images. In the embodiment, it is assumed that the remote temperature sensor 110 detects the area-to-be-monitored 105 to generate a thermal image 150 every preset time (for example, every second). Therefore, during a detection time period when the gas leak detection device 100 is enabled, the processor may obtain the thermal image 150 corresponding to each preset time (for example, every second).

In step S220, the processor 120 calculates a detected temperature value of each environmental block according to each of the plurality of environmental block in each thermal image 150. In detail, the thermal image 150 in FIG. 1 is divided into 64 (8×8) environmental blocks, and the processor 120 selects the smallest corresponding temperature value of the plurality of pixel positions in each environmental block (i.e., the temperature value with the lowest temperature of a plurality of pixel positions in each environmental block) as the detected temperature value of this environmental block. Therefore, the processor 120 may generate 64 detected temperature values (the temperature values with the lowest temperatures among the plurality of pixel positions in the environmental blocks) based on the 64 environmental blocks.

In step S230, the processor 120 calculates a temperature judgment threshold based on the detected temperature value of each environmental block in the detection time period when the gas leak detection device 100 is enabled. The detection time period in the embodiment may refer to a time period within a preset time from a current time, for example, a time period within 30 seconds from the current time. The processor 120 may calculate the temperature judgment threshold based on the detected temperature value of each environmental block obtained during the detection time period (within 30 seconds from the current time), so as to dynamically learn a current environmental temperature of the area-to-be-monitored 105. In detail, since the environmental temperature may be affected by factors such as a weather of the day, seasonal changes, etc., the embodiment of the disclosure does not use a preset value (a fixed value) as the current environmental temperature, but obtains a dynamic temperature judgment threshold through calculation by using the detected temperature values of each environmental block in the thermal image 150, so as to determine whether the temperature of the ROI is abnormal, such that the gas leak detection device 100 and the detection method of FIG. 2 are more applicable to various situations. Step S230 has more details, please refer to the description of subsequent embodiments.

The processor 120 of the embodiment may also determine whether to calculate the temperature judgment threshold in step S230 based on a number of batches of data in the thermal image 150. If the number of batches of data in the thermal image 150 is few, the temperature judgment threshold will be inaccurate. The processor 120 in the embodiment may set not to calculate the temperature judgment threshold in step S230 before obtaining N batches of data of the thermal images 150, where N is a positive integer (for example, in the embodiment, N is equal to "10", a minimum batch). Taking the detection of one thermal image 150 per second as an example, it is assumed that a first batch of data of the thermal image 150 is obtained at a time T1 when the gas leak detection device 100 is enabled, then 10 batches of data of the thermal image 150 are obtained at a time T10

(i.e., 10 seconds after the enabling), and the temperature judgment threshold of step S230 is calculated according to N ("10") batches of data of the thermal image 150 obtained from the time T1 to the time T10. In other words, the 1-9 batches of data of the thermal image 150 are obtained at the times T1-T9 when the gas leak detection device 100 is enabled, but the processor 120 will not perform the calculation step S230 at the times T1-T9.

On the other hand, the processor 120 may use M batches of data of the thermal image 150 obtained so far to dynamically generate and calculate the temperature judgment threshold in step S230, where M is a positive integer and M is greater than N (for example, in the embodiment, M is equal to "30", a maximum batch). Taking the detection of one thermal image 150 per second as an example, it is assumed that a $30^{th}$ batch of data of the thermal image 150 is obtained at a time T30 when the gas leak detection device 100 is enabled, then the processor 120 calculates the temperature judgment threshold of step S230 according to the M ("30") batches of data of the thermal image 150 obtained from the time T1 to the time T30. It is assumed that a $31^{st}$ batch of data of the thermal image 150 is obtained at a time T31 when the gas leak detection device 100 is enabled, then the processor 120 calculates the temperature judgment threshold of step S230 according to the M ("30") batches of data of the thermal image 150 obtained from the time T2 to the time T31. Deduced by analogy, it is assumed that a $K^{th}$ batch of data of the thermal image 150 is obtained at a time TK when the gas leak detection device 100 is enabled, where K is a positive integer greater than M, then the processor 120 calculates the temperature judgment threshold of step S230 according to the M ("30") batches of data of the thermal image 150 obtained from a time T(K−M+1) to the time TK. In addition, since the time for detecting one thermal image 150 may be set (for example, one thermal image 150 is detected every second), the detection time period described in the embodiment may also be determined by a time length of obtaining the M batches of data of the thermal image 150 so far.

In step S240, the processor 120 determines whether a temperature of at least one ROI (such as the ROIs 151-155) is abnormal based on the temperature judgment threshold calculated in step S230, and performs the aforementioned warning operation when the temperature of one or more of the ROIs (for example, the ROIs 151-155) is abnormal. In detail, the processor determines whether the detected temperature values of the ROIs 151-155 are lower than the aforementioned temperature judgment threshold, so as to determine whether the temperatures of the ROIs 151-155 are abnormal. If the temperature of the ROI is lower than the aforementioned temperature judgment threshold, it means that the environmental temperature of the ROI is low, which may be a result of the liquefied gas leaking from the pipeline (ROI) and gaining heat energy from nearby (the liquefied gas is converted into gas), resulting in a decrease in environmental temperature near the ROI.

For example, the ROI 151 in FIG. 1 corresponds to six environmental blocks. When the detected temperature values of the ROI (i.e., the lowest temperature values in the environmental blocks) are not lower than (equal to or higher than) the aforementioned temperature judgment threshold, it represents that the temperature of the ROI 151 is not abnormal. However, as long as the lowest temperature value in the ROI 151 is lower than the aforementioned temperature judgment threshold, it represents that the temperature of the ROI 151 in FIG. 1 is abnormal. The ROIs 152-155 in FIG. 1 respectively correspond to two respective environmental blocks, and when the detected temperature values of the ROIs (i.e., the lowest temperature values in the ROIs) are not lower than (equal to or higher than) the aforementioned temperature judgment threshold, it represents that the ROIs 152-155 are not abnormal. However, as long as the lowest temperature value in one of the ROIs is lower than the aforementioned temperature judgment threshold, it represents that the temperature of one corresponding region in the ROIs 152-155 of FIG. 1 is abnormal.

Figure 4:
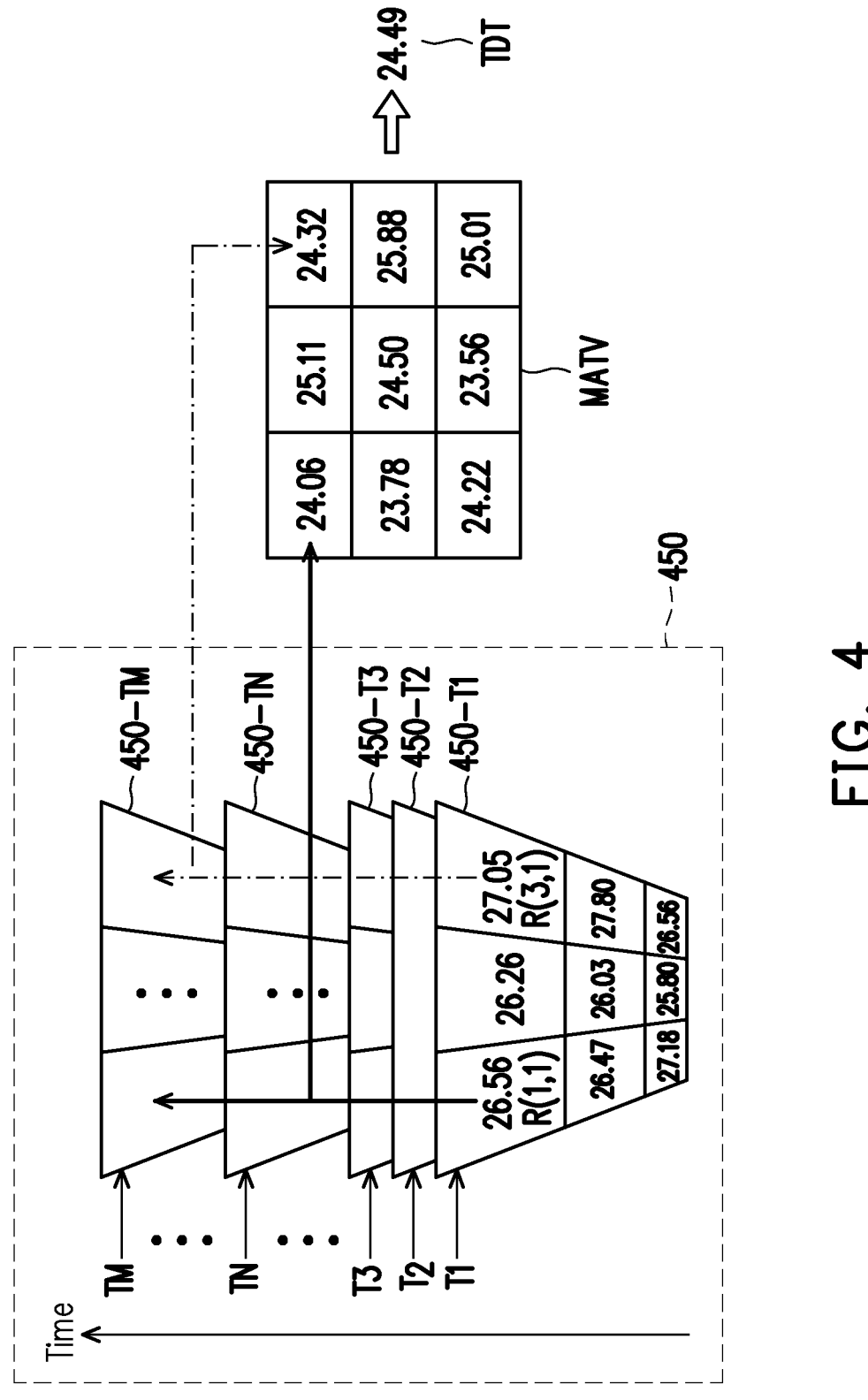
FIG. 4 is a schematic diagram of a thermal image in step S230 of FIG. 2.

FIG. 3 is a detailed flowchart of step S230 in FIG. 2. FIG. 4 is a schematic diagram of a thermal image 450 in step S230 of FIG. 2. FIG. 4 is a simple explanation of each sub-steps S231 to S234 in step S230 of FIG. 2 by using a 3×3 environmental block in the thermal image 450. The thermal image 450 of FIG. 4 includes thermal images 450-T1 to 450-TM obtained at various times T1-TM. The thermal image 450 of FIG. 4 includes two environmental blocks R(1, 1) and R(3, 1) serving as an example.

Referring to FIG. 3 and FIG. 4 at the same time, in step S231, the processor obtains a first quartile Q1 and a third quartile Q3 in a quartile statistical manner based on the detected temperature value of each environmental block in the aforementioned detection time period. In the thermal image 450-T1 at the time T1, the smallest one of the corresponding temperature values of a plurality of pixel positions in the environmental block R(1, 1) is 26.56, and the smallest one of the corresponding temperature values of a plurality of pixel positions in the environmental block R(3, 1) is 27.05. Therefore, after the times T1-TM have passed, M batches of data of the thermal images 450-T1 to 450-TM may be obtained, and the smallest one of the corresponding temperature values of the environmental blocks R(1, 1) and R(3, 1) in different times T1-TM is obtained through calculation. In the embodiment, the smallest corresponding temperature values of the environmental blocks in the times T1-TM are arranged in a sequence from small to large, and a value of 25% of all the values in the sequence arranged from small to large is taken as the first quartile Q1, and a value of 75% of all the values in the sequence arranged from small to large is taken as the third quartile Q3. The third quartile Q3 may be greater than or equal to the first quartile Q1.

In step S232, the processor subtracts the first quartile Q1 from the third quartile Q3 to obtain an interquartile range value IQR.

In step S233, the processor obtains a minimum allowable temperature value of each environmental block based on the first quartile Q1, the interquartile range value IQR and an adjustment parameter Cot. In detail, the processor subtracts a product of the interquartile range value IQR and the adjustment parameter Cot from the first quartile Q1 to obtain a minimum allowable temperature value MATV ($MATV=Q1-Cot*IQR$). A value of the adjustment parameter Cot may be adjusted or set accordingly according to environmental requirements.

Based on the aforementioned steps S231-S233, the processor calculates the corresponding minimum allowable temperature value MATV for each environmental block. For example, the minimum allowable temperature value MATV of the environmental blocks R(1, 1) and R(3, 1) are respectively 24.06 and 24.32.

In step S234, the processor calculates a temperature judgment threshold TDT of step S230 based on the minimum allowable temperature value of each environmental block. In detail, in other embodiments, an adjusted weight may also be set for each environmental block, and products of the minimum allowable temperature values of each of the environmental blocks and the adjusted weights are added and then averaged, thereby obtaining the aforementioned temperature judgment threshold TDT (shown as "24.49" in FIG. 4).

In summary, the gas leak detection device and the detecting method thereof described in the embodiments of the disclosure use an infrared temperature sensor to sense and capture thermal images/temperature information of the area-to-be-monitored, and then use the thermal images/temperature information and historic thermal images/temperature information to dynamically calculate the temperature threshold (not a fixed temperature threshold), and determine whether the ROI in the area-to-be-monitored has excessively low temperature based on the temperature threshold. In this way, various embodiments of the disclosure may determine whether the gas leaks by detecting the environmental temperature variation (for example, temperature drop) caused by accidental release of the liquefied gas, thereby monitoring the environment to be monitored at a lower cost.

What is claimed is:

1. A gas leak detection device, comprising:
a remote temperature sensor, configured to detect an area-to-be-monitored to obtain a plurality of thermal images, wherein each pixel position in the thermal images comprises a corresponding temperature value; and
a processor, coupled to the remote temperature sensor, wherein the processor is configured to:
obtain the thermal images from the remote temperature sensor,
calculate a detected temperature value of each environmental block according to each of a plurality of environmental blocks in each thermal image,
calculate a temperature judgment threshold based on the detected temperature value of each environmental block in a detection time period,
determine whether a temperature of at least one region-of-interest is abnormal based on the temperature judgment threshold, and
perform a warning operation when the temperature of the at least one region-of-interest is abnormal,
wherein the processor is configured to calculate the temperature judgment threshold only when the plurality of thermal images includes at least N batches of data, wherein N is a positive integer,
wherein the processor is configured to dynamically generate and calculate the temperature judgment threshold using only M batches of data of the thermal image sequentially obtained up to a current calculation time, wherein M is a positive integer, and M is greater than N.

2. The gas leak detection device as claimed in claim 1, wherein the detected temperature value of each environmental block is a smallest corresponding temperature value of each pixel position in each environmental block,
the at least one region-of-interest belongs to at least one of the environmental blocks in the thermal images, and
the processor determines whether a detected temperature value of the at least one region-of-interest is lower than the temperature judgment threshold, so as to determine whether the temperature of the at least one region-of-interest is abnormal.

3. The gas leak detection device as claimed in claim 1, wherein the processor obtains a first quartile and a third quartile in a quartile statistical manner based on the detected temperature value of each environmental block in the detection time period, subtracts the first quartile from the third quartile to obtain an interquartile range value, obtains a minimum allowable temperature value of each environmental block based on the first quartile, the interquartile range value and an adjustment parameter, and calculates the temperature judgment threshold based on the minimum allowable temperature value of each environmental block.

4. The gas leak detection device as claimed in claim 3, wherein the processor subtracts a product of the interquartile range value and the adjustment parameter from the first quartile to obtain the minimum allowable temperature value.

5. A gas leak detecting method, comprising:
using a remote temperature sensor to detect an area-to-be-monitored to obtain a plurality of thermal images, wherein each pixel position in the thermal images comprises a corresponding temperature value;
calculating a detected temperature value of each environmental block according to each of a plurality of environmental blocks in each thermal image;
calculating a temperature judgment threshold based on the detected temperature value of each environmental block in a detection time period; and
determining whether a temperature of at least one region-of-interest is abnormal based on the temperature judgment threshold, and performing a warning operation when the temperature of the at least one region-of-interest is abnormal,
wherein the step of calculating the temperature judgment threshold comprises:
calculating the temperature judgment threshold only when the plurality of thermal images includes at least N batches of data, wherein N is a positive integer; and
dynamically generate and calculate the temperature judgment threshold using only M batches of data of the thermal image sequentially obtained up to a current calculation time, wherein M is a positive integer, and M is greater than N.

6. The gas leak detecting method as claimed in claim 5, wherein the step of calculating the temperature judgment threshold based on the detected temperature value of each environmental block in the detection time period comprises:
obtaining a first quartile and a third quartile in a quartile statistical manner based on the detected temperature value of each environmental block in the detection time period;
subtracting the first quartile from the third quartile to obtain an interquartile range value;
obtaining a minimum allowable temperature value of each environmental block based on the first quartile, the interquartile range value and an adjustment parameter; and
calculating the temperature judgment threshold based on the minimum allowable temperature value of each environmental block.

7. The gas leak detecting method as claimed in claim 6, wherein the step of obtaining the minimum allowable temperature value based on the first quartile, the interquartile range value and the adjustment parameter comprises:
subtracting a product of the interquartile range value and the adjustment parameter from the first quartile to obtain the minimum allowable temperature value.

8. The gas leak detecting method as claimed in claim 5, wherein the detected temperature value of each environmental block is a smallest corresponding temperature value of each pixel position in each environmental block,
the at least one region-of-interest belongs to at least one of the environmental blocks in the thermal images, and the step of determining whether the temperature of the at least one region-of-interest is abnormal based on the temperature judgment threshold comprises:

determining whether a detected temperature value of the at least one region-of-interest is lower than the temperature judgment threshold, so as to determine whether the temperature of the at least one region-of-interest is abnormal.

\* \* \* \* \*